United States Patent
Inoue (10) Patent No.: US 7,455,324 B2
(45) Date of Patent: Nov. 25, 2008

(54) PIPE JOINT

(75) Inventor: Hiroshi Inoue, Kawachinagano (JP)

(73) Assignee: Higashio Mech Co., Ltd., Kawachinagano-Shi (JP)

( * ) Notice: Subject to any disclaimer, the term of this patent is extended or adjusted under 35 U.S.C. 154(b) by 0 days.

(21) Appl. No.: 11/281,379

(22) Filed: Nov. 18, 2005

(65) Prior Publication Data

US 2006/0113790 A1    Jun. 1, 2006

(30) Foreign Application Priority Data

Nov. 29, 2004    (JP)    ............... 2004-344599

(51) Int. Cl.
*F16L 35/00*    (2006.01)
*F16L 37/00*    (2006.01)
*F16L 47/00*    (2006.01)

(52) U.S. Cl. ............... 285/3; 285/81; 285/91; 285/242; 285/244; 285/259

(58) Field of Classification Search ............ 285/81, 285/91, 242, 244, 259, 239, 3
See application file for complete search history.

(56) References Cited

U.S. PATENT DOCUMENTS

| 4,226,445 | A | * | 10/1980 | Kramer | 285/39 |
| 4,278,279 | A | * | 7/1981 | Zimmerman | 285/255 |
| 4,635,966 | A | * | 1/1987 | Hermann | 285/3 |
| 5,022,687 | A | * | 6/1991 | Ariga | 285/321 |
| 5,074,600 | A | * | 12/1991 | Weinhold | 285/243 |
| 5,390,963 | A | * | 2/1995 | Namekawa | 285/86 |
| 6,231,084 | B1 | * | 5/2001 | Hester et al. | 285/23 |
| 2002/0185861 | A1 | * | 12/2002 | Inoue et al. | 285/3 |

FOREIGN PATENT DOCUMENTS

JP    2002-31282    1/2002

\* cited by examiner

*Primary Examiner*—James M Hewitt
*Assistant Examiner*—Jay R Ripley
(74) *Attorney, Agent, or Firm*—Kratz, Quintos & Hanson, LLP (57) ABSTRACT

A pipe joint provided with a joint main body having an insertion cylinder portion inserted to an end portion of a pipe to be connected, a clamp ring having a slit to fasten the end portion of the pipe inserted to the insertion cylinder portion by elastic fastening force, a diameter-expansion piece, releasable as to jump outward, held within the slit to expand the clamp ring against elastic force of the clamp ring, and a restriction sleeve covering the clamp ring as to restrict the outward jump of the diameter-expansion piece. And, a pipe-insertion detector, detecting the insertion of the pipe to a predetermined depth to release the restriction, is provided.

2 Claims, 13 Drawing Sheets

PIPE JOINT

BACKGROUND OF THE INVENTION

1. Field of the Invention

This invention relates to a pipe joint.

2. Description of the Related Art

A conventional pipe joint to connect pipes of synthetic resin for water supply is provided with a joint main body having an insertion cylinder portion inserted to an end portion of a pipe, a clamp ring having a slit to fasten the end portion of the pipe inserted to the insertion cylinder portion by elastic fastening force, and a diameter-expansion piece releasably held within the slit as to expand a fastening ring against the elastic force of the clamp ring and released when the pipe is inserted (refer to Japanese patent provisional publication No. 2002-31282).

In this conventional pipe joint, a defective work, in which the insertion of the pipe is not enough despite the release of the diameter-expansion piece, may be conducted. And, the insertion depth of the pipe may be excessively small, resistance against drawing may be made weak, and the insertion depth can not be regulated because the diameter-expansion piece is held by inner end portion in an axis direction of the clamp ring. And, the clamp ring may become tapered as the inner diameter of the outer end portion (to which the pipe is inserted) in the axis direction is small because the diameter-expansion piece is held by inner end portion in an axis direction of the clamp ring. This makes holding work (insertion work) of the diameter-expansion piece difficult because the insertion of the end portion of the pipe is hard to conduct, and the clamp ring is required to be preliminarily expanded large.

It is therefore an object of the present invention to provide a pipe joint with which pipes are easily connected, misconnection of the piping is certainly checked, and defective work can be prevented beforehand. Further, it is also an object to provide a pipe joint with which the clamp ring is expanded uniformly in the axis direction (as not to be tapered) and the pipe is smoothly inserted.

BRIEF DESCRIPTION OF THE DRAWINGS

The present invention will be described with reference to the accompanying drawings, in which.

DESCRIPTION OF THE PREFERRED EMBODIMENTS

Preferred embodiments of the present invention will now be described with reference to the accompanying drawings.

Figure 1:
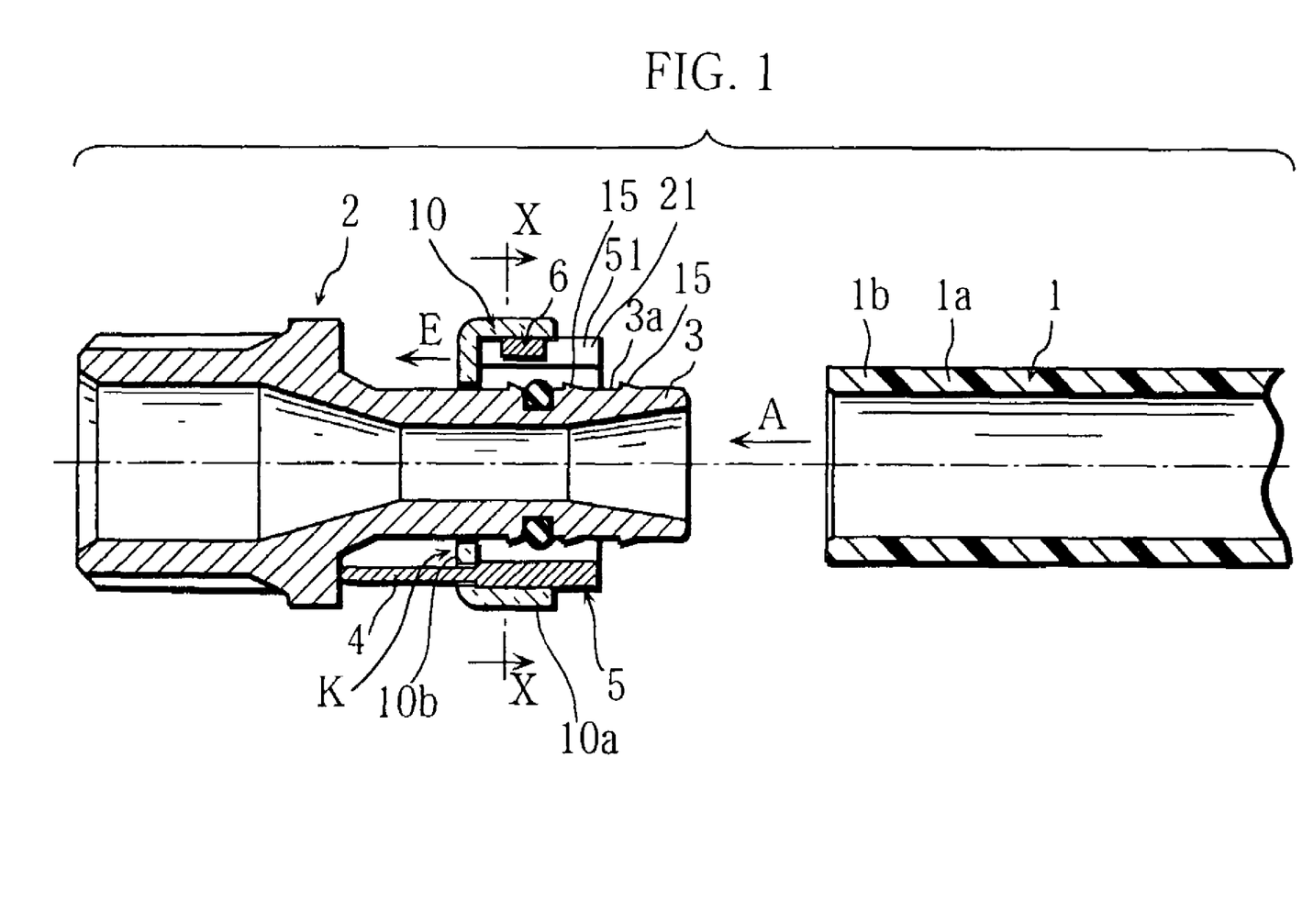
FIG. 1 is a schematic cross-sectional front view showing a first embodiment of a pipe joint of the present invention.

FIG. 1 shows a first embodiment of the present invention. This pipe joint is provided with a joint main body 2 of metal having an insertion cylinder portion 3 to be inserted to an end portion 1a of a pipe 1 of synthetic resin to be connected and a clamp ring 5 having a slit 51 to fasten the end portion 1a of the pipe 1 put onto the insertion cylinder portion 3 by elastic fastening force. The clamp ring 5 is composed of metal, for example, of spring steel. A hitching stop portion 15, having plural peripheral tapers to stop the pipe 1 against drawing out, is formed on a peripheral face 3a of the insertion cylinder portion 3.

A mark 6 represents a diameter-expansion piece (jumper pin) releasably held within the slit 51 as to expand the clamp ring 5 against the elastic force of the clamp ring 5. The diameter-expansion piece 6 is composed of metal, for example, of high-rigidity steel. A mark 10A represents a restriction sleeve covering the clamp ring 5 to restrict jumping movement of the diameter-expansion piece 6 in an outward diameter direction, and to allow the jumping movement of the diameter-expansion piece 6 in the outward diameter direction in contact with a forth end portion 1b of the inserted pipe 1 and slid in an axis inner direction E. The restriction sleeve 10A is composed of transparent synthetic resin. And the restriction sleeve 10A is composed of a cylindrical wall portion 10a and a right-angle wall portion 10b at right angles with the axis direction.

That is to say, a pipe-insertion detector K, which detects the insertion of the pipe 1 to a predetermined depth and releases the restriction, is provided. The pipe-insertion detector K is composed of the right-angle wall portion 10b.

Figure 2:
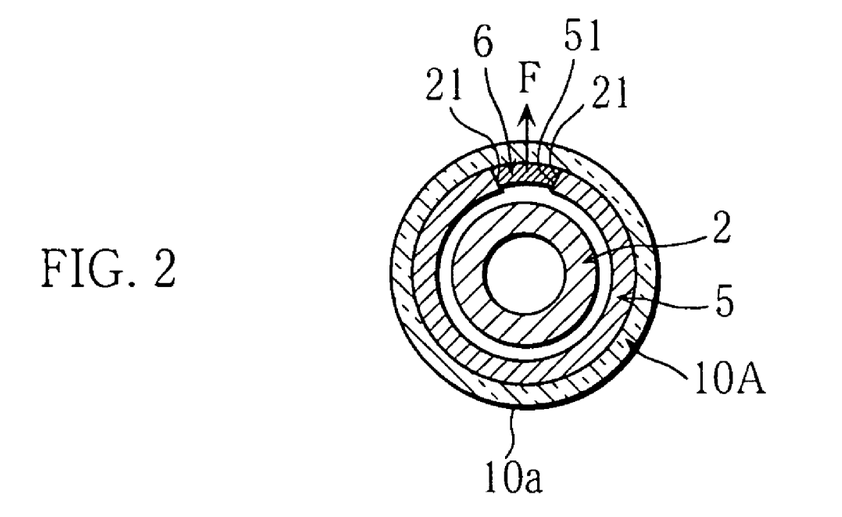
FIG. 2 is a cross-sectional view of X-X line in FIG. 1.
Figure 3A:
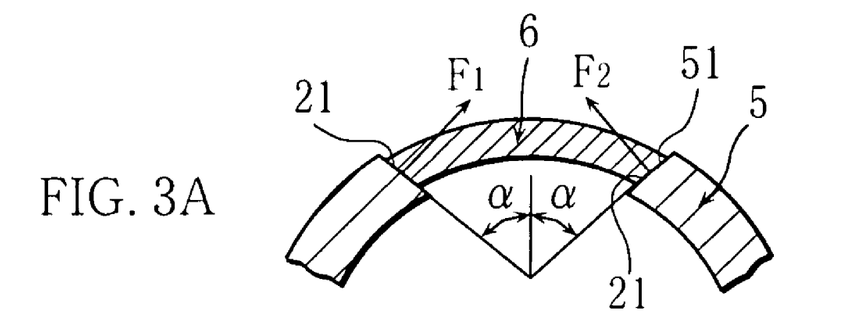
FIG. 3A is an explanatory view of force working on a diameter-expansion piece.
Figure 3B:
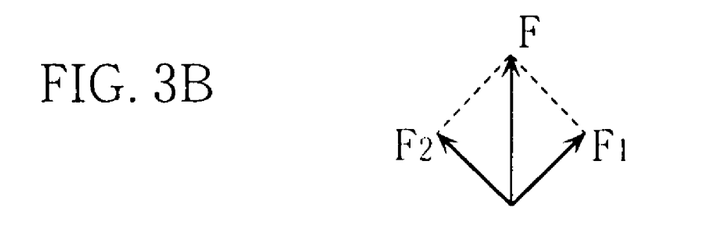
FIG. 3B is a vector diagram showing resultant force.

As shown in FIGS. 2, 3A, and 3B, opening both end faces 21 forming the slit 51 of the clamp ring 5 are formed as to expand in outward diameter directions (as to make inclination faces) when observed in the axis direction, and force F from the end faces 21 makes the diameter-expansion piece 6 jump in the outward diameter direction. Concretely, the opening end face 21 is inclined for an angle α of 20°<α<60° when observed in the axis direction. When the angle α is within this range, the diameter-expansion piece 6 receives appropriate force F from the end faces 21 of the clamp ring 5. And, if the angle α is out of this range, the diameter-expansion piece 6 can not receive the appropriate force F. The force F is a resultant force of force $F_1$ and force $F_2$ received by the diameter-expansion piece 6 from the opening end faces 21 forming the slit 51.

Figure 4:
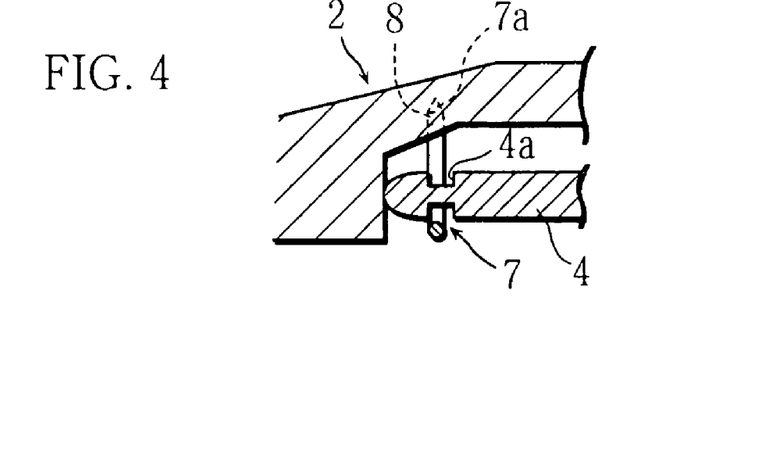
FIG. 4 is an enlarged cross-sectional front view of a principal portion.
Figure 5:
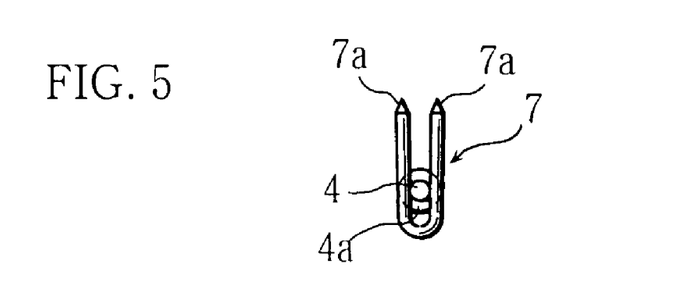
FIG. 5 is an explanatory cross-sectional front view of a principal portion.
Figure 6:
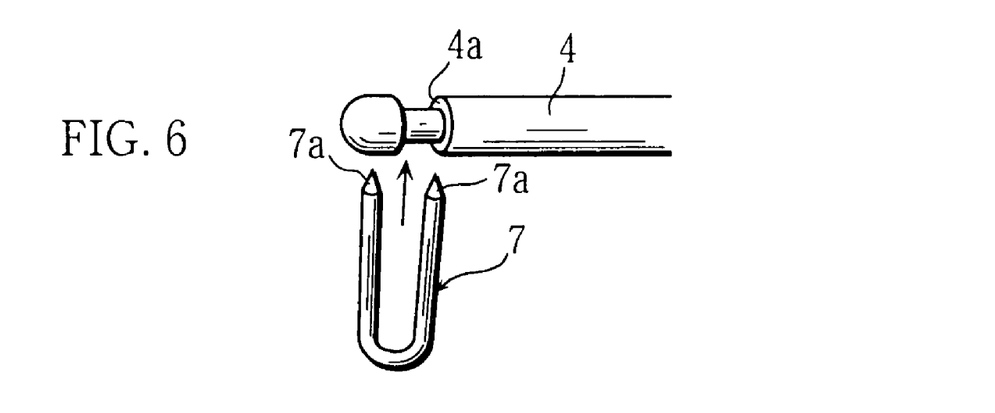
FIG. 6 is an explanatory perspective view of a principal portion.

FIGS. 4, 5, and 6 show an example of a holding construction for the clamp ring which is omitted in FIG. 1. The clamp ring 5 (refer to FIG. 1) has a stopping rod 4 to contact the joint main body 2 and prevent movement in the axis direction. The stopping rod 4 has a peripheral concave groove 4a on an end portion. A mark 7 shows a fastening piece 7 composed of U-shaped wire. The joint main body 2 has holes 8 to which both ends 7a of the fastening piece 7 are tightly inserted. The both ends 7a of the fastening piece 7 are inserted to the holes 8 to attach to the joint main body 2 while the fastening piece 7 is fitted to the peripheral concave groove 4a as to regulate the movement of the clamp ring 5. That is to say, the clamp ring 5 is prevented from moving in the axis direction while being able to move in diameter direction (as to diminish in diameter).

As shown in FIG. 1, the diameter-expansion piece 6 is held (disposed) on a position approximately central in the axis direction of the slit 51 of the clamp ring 5. That is to say, in this construction, the diameter-expansion piece 6 can be disposed on a position (approximately central on the axis) sufficiently distant from the inner end portion of the clamp ring 5 because the jumping out (jumping movement) of the diameter-expansion piece 6 is restricted through the cylindrical restriction sleeve 10A having the right-angle wall portion 10b formed as an inner brim.

Therefore, the clamp ring 5 expands with uniform diameter in the axis direction (without being tapered), the forth end portion 1b of the pipe can be easily inserted, and it is unnecessary to excessively expand the clamp ring (as in conventional joints).

And, the length in the axis direction of the clamp ring 5 can be set to be sufficiently long, and the pipe 1 can be fastened in a stable position.

Figure 7:
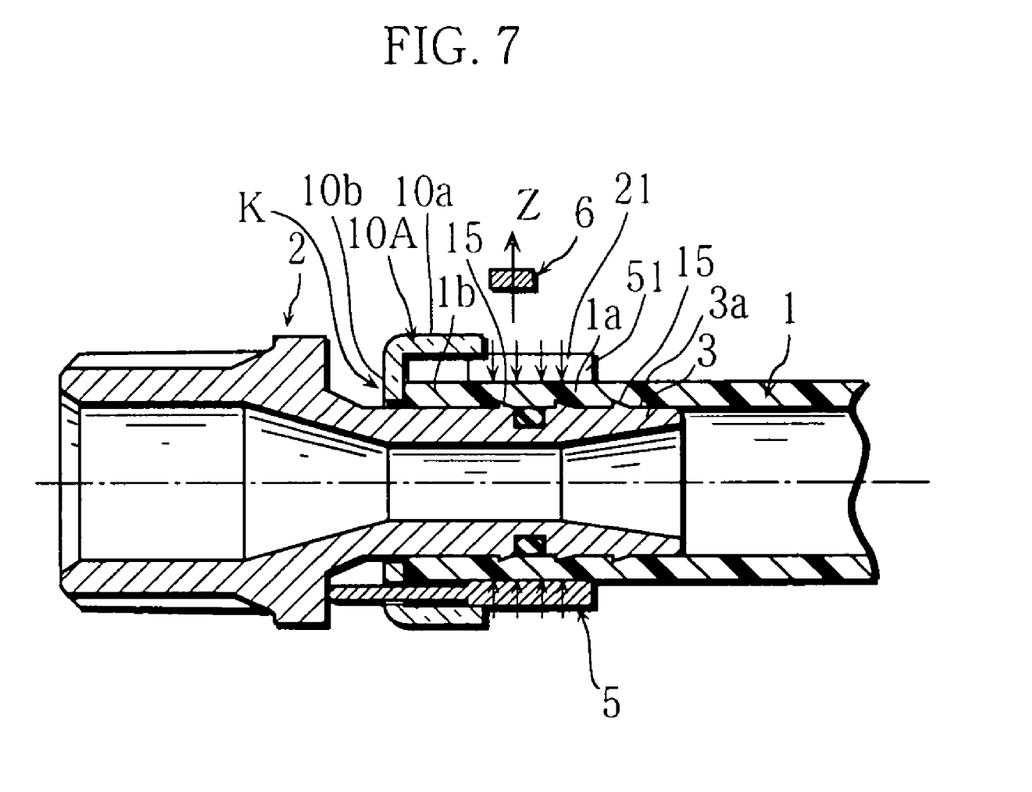
FIG. 7 is a functional explanatory view of the first embodiment.

FIG. 7 is a functional explanatory view of the first embodiment. When the pipe 1 to be connected in the state of FIG. 1 is moved in an arrow A direction in FIG. 1, the forth end portion 1a of the pipe 1 contacts and slides the right-angle wall portion 10b of the restriction sleeve 10A in the axis inner direction E. When the restriction sleeve 10A parts from the diameter-expansion piece 6, the diameter-expansion piece 6, restricted not to jump outward in the diameter direction, jumps in an outward direction (an arrow Z direction in FIG. 7).

Figure 8:
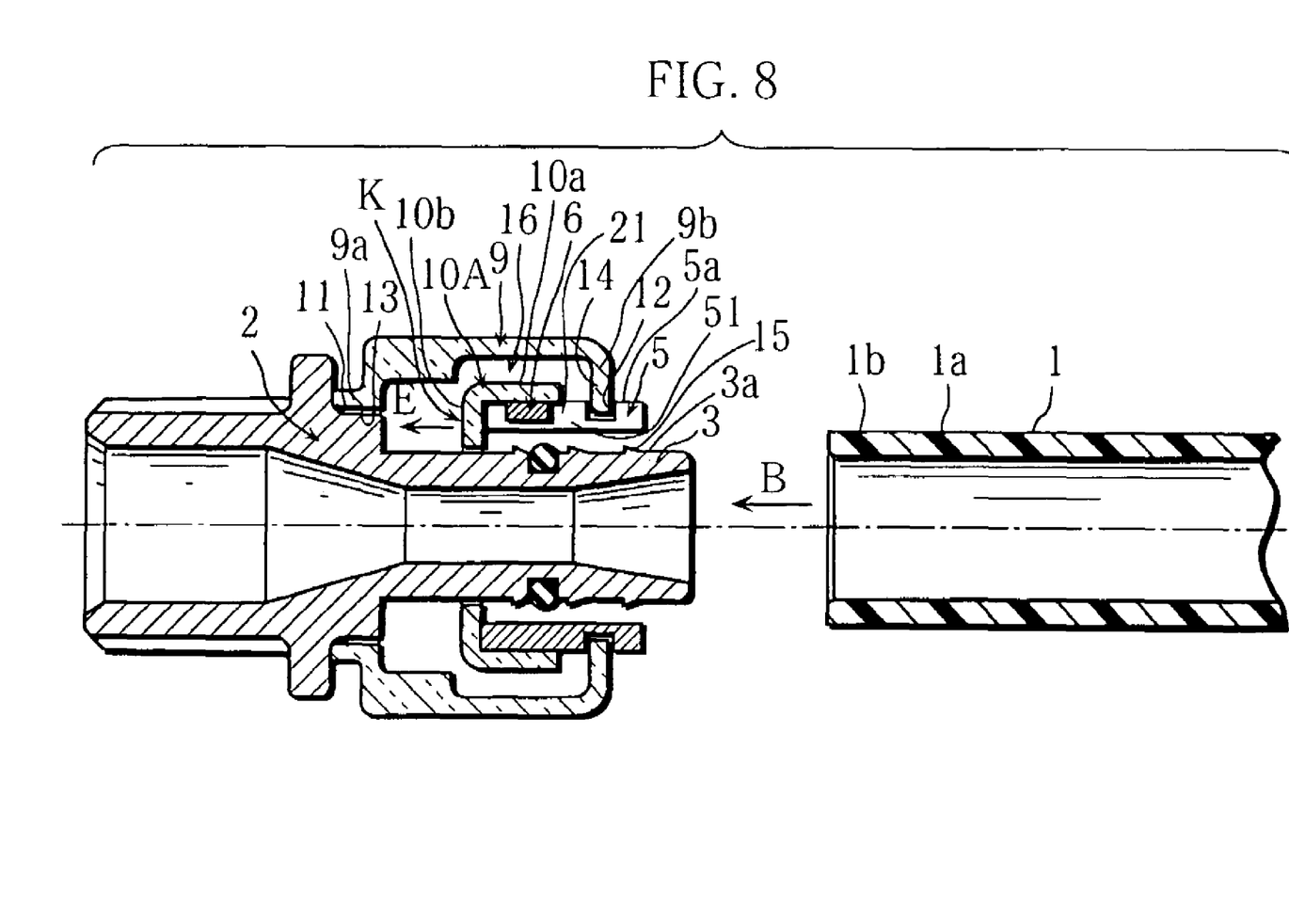
FIG. 8 is a cross-sectional front view showing a second embodiment.

FIG. 8 shows a second embodiment. This pipe joint has a transparent cover 9 of synthetic resin. The transparent cover 9 includes the restriction sleeve 10A and forms an escape space 16 to contain the diameter-expansion piece 6 released from the slit 51. The joint main body 2 has a male screw portion 11. The clamp ring 5 has a peripheral concave groove 12 on the peripheral face 5a. The transparent cover has a female screw portion 13 on an end 9a to screw onto the male screw portion 11, and a hitching ring portion 14 on another end 9b to fit to the peripheral concave groove 12 of the clamp ring 5. With this construction, the clamp ring 5, the diameter-expansion piece 6, and the restriction sleeve 10A can be easily handled unitedly with the joint main body 2, and the clamp ring 5 is prevented from moving in the axis direction when the pipe 1 is connected. Other parts of the second embodiment are composed similarly to that of the first embodiment.

Figure 9:
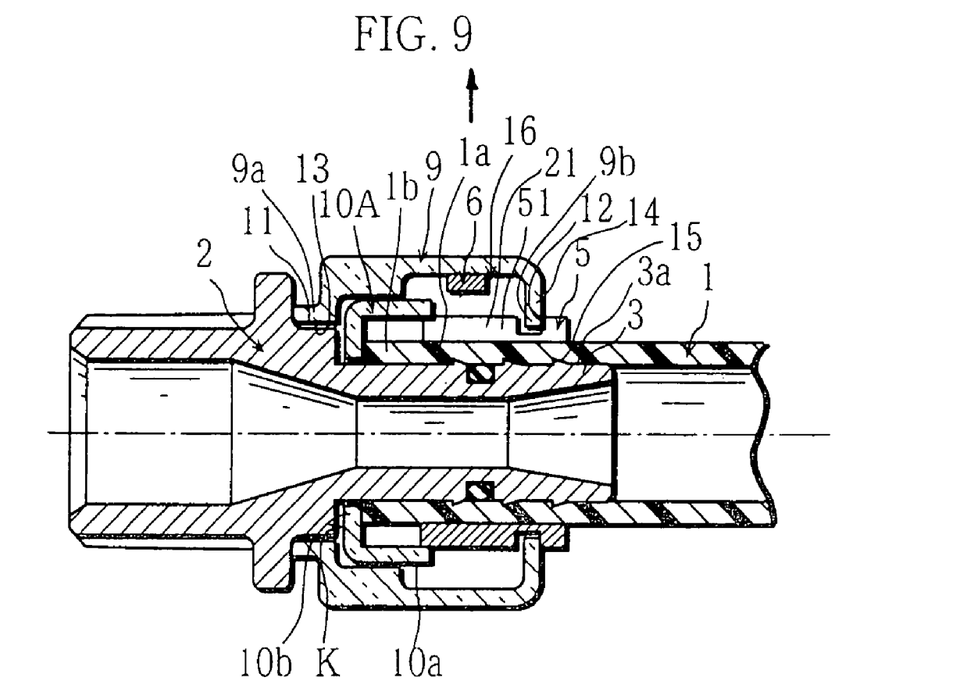
FIG. 9 is a functional explanatory view of the second embodiment.

FIG. 9 is a functional explanatory view of the second embodiment. When the pipe 1 to be connected in the state of FIG. 8 is moved in an arrow B direction in FIG. 8, the forth end portion 1b of the pipe 1 contacts and slides the right-angle wall portion 10b of the restriction sleeve 10A in the axis inner direction. When the restriction sleeve 10A parts from the diameter-expansion piece 6, the diameter-expansion piece 6 jumps in an outward direction (in the direction of the arrow in FIG. 9). The diameter-expansion piece 6 is prevented from jumping toward the face of the worker for safety because the diameter-expansion piece 6 after the jump remains within the transparent cover 9.

Figure 10:
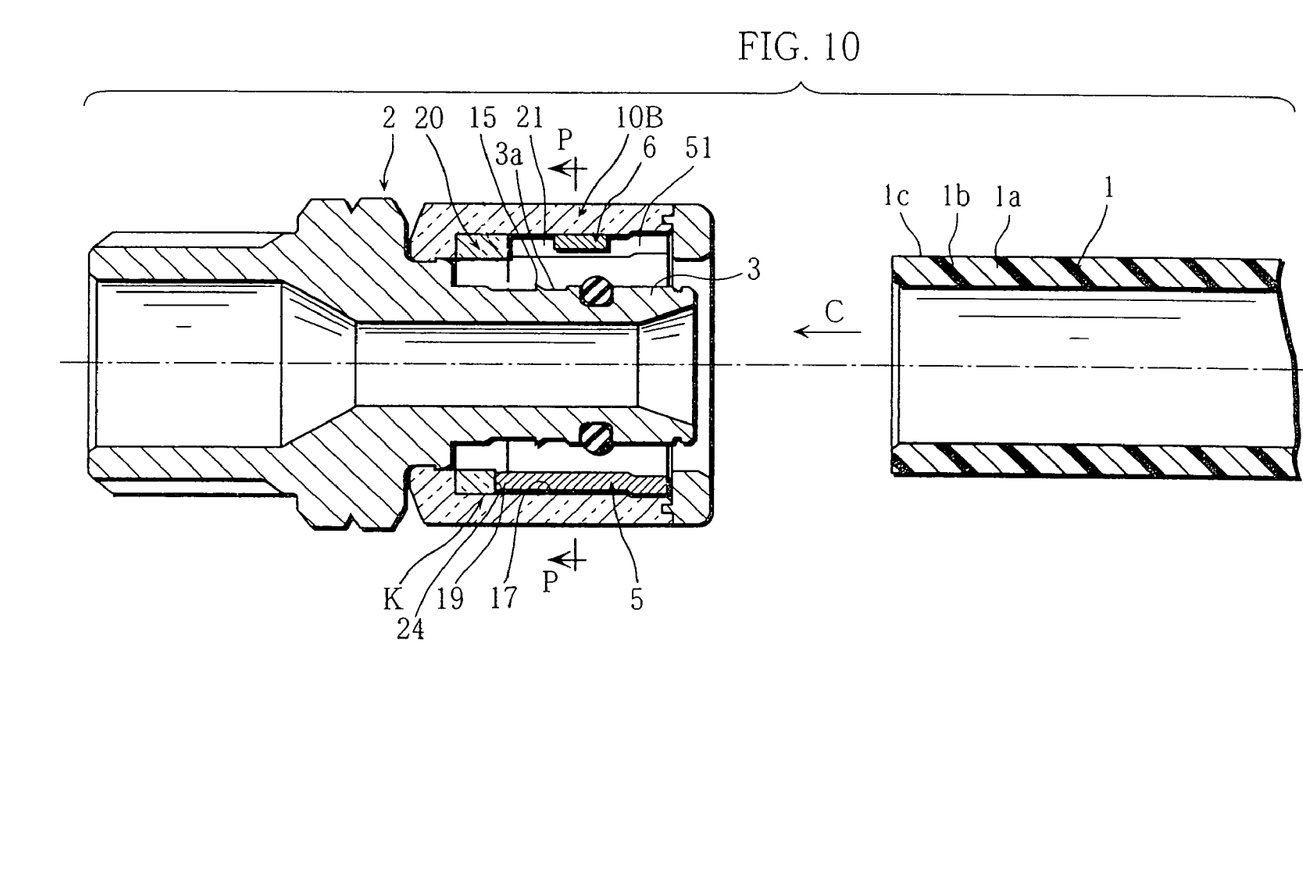
FIG. 10 is a cross-sectional front view showing a third embodiment.
Figure 11:
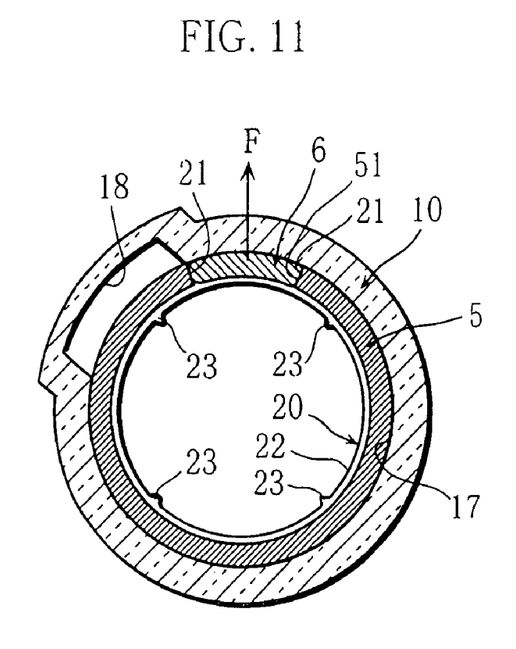
FIG. 11 is a cross-sectional view of P-P line in FIG. 10.
Figure 21:
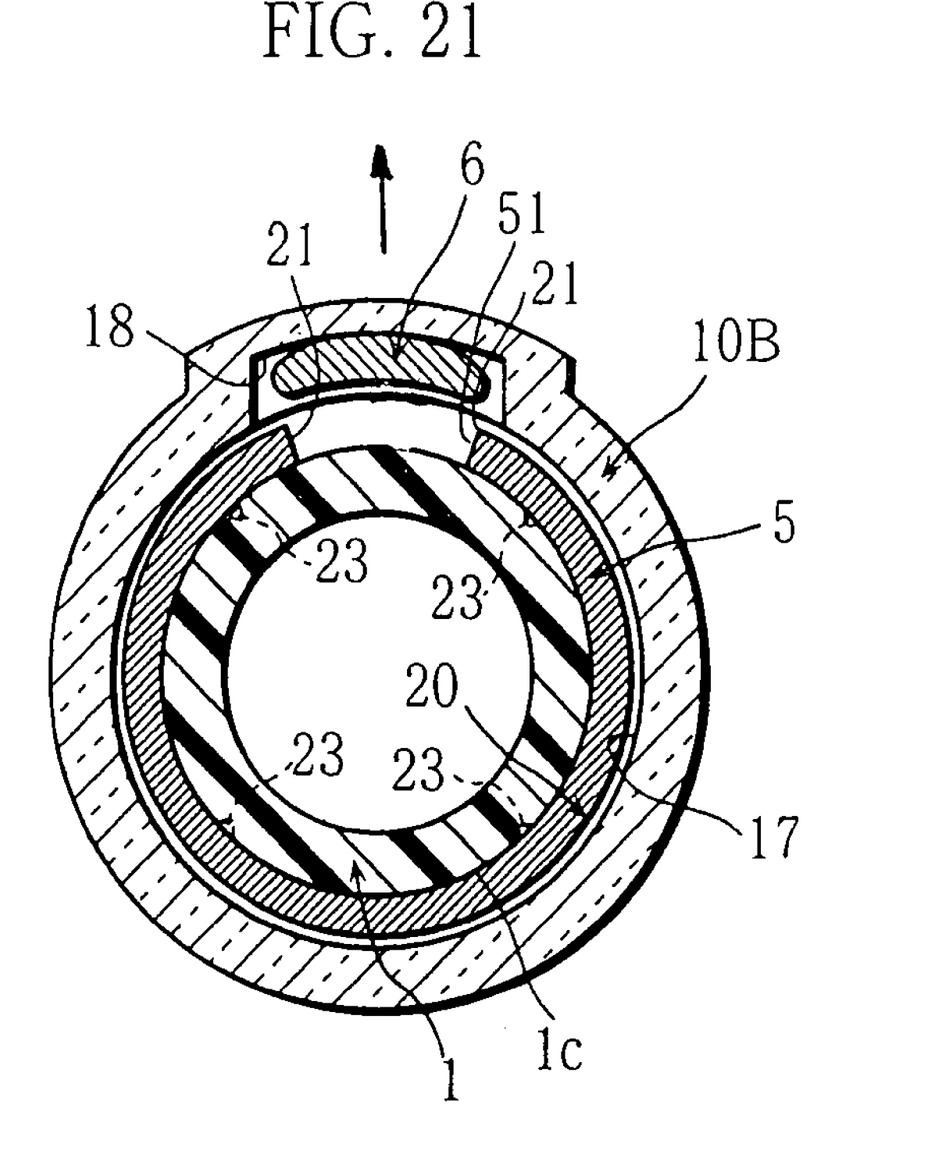
FIG. 21 is a cross-sectional view of R-R line in FIG. 20.

FIGS. 10 and 11 show a third embodiment. The joint main body 2 is not shown in FIG. 11 (the joint main body 2 is also omitted similarly in later-described FIGS. 19 and 21). A mark 10B shows a hand-rotatable restriction sleeve mounted to the clamp ring 5 as to restrict the outward jumping movement of the diameter-expansion piece 6 and having an escape concave portion 18 on a part of an inner peripheral face 17 to allow the jumping movement. The restriction sleeve 10B is composed of transparent synthetic resin.

Figure 12:
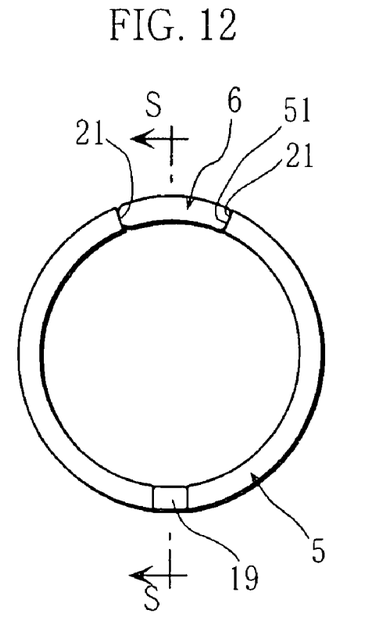
FIG. 12 is an explanatory view.
Figure 13:
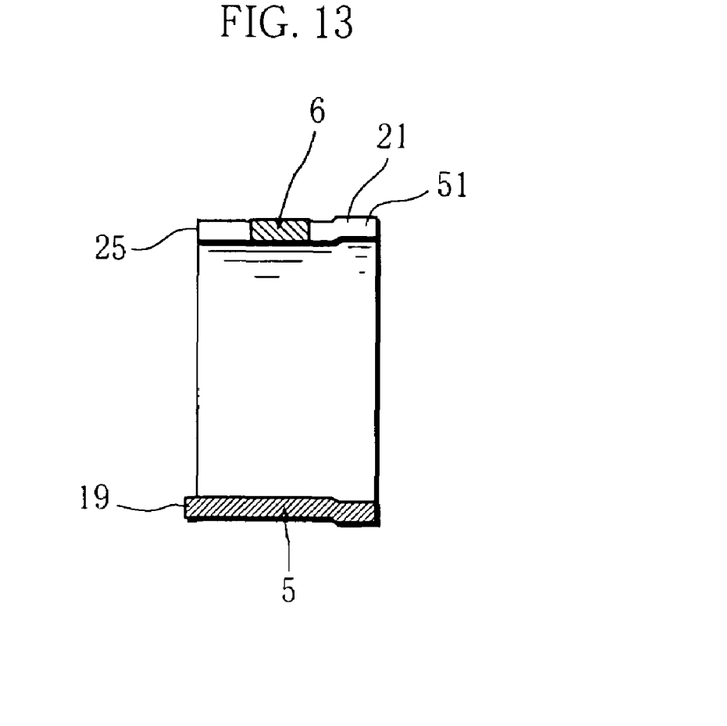
FIG. 13 is a cross-sectional view of S-S line in FIG. 12.

As shown in FIGS. 12 and 13, the clamp ring 5 has a male fitting portion (hitching convex portion) 19 on a part of an inner end face in the axis direction. This male fitting portion (hitching convex portion) 19 is preferably disposed on a position in peripheral direction opposite to the slit 51 for approximately 180°.

Figure 14:
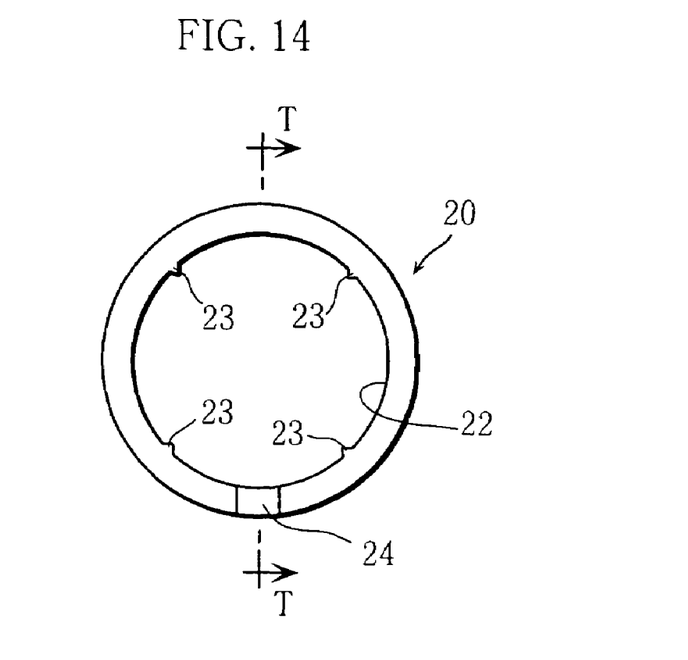
FIG. 14 is an explanatory view.
Figure 15:
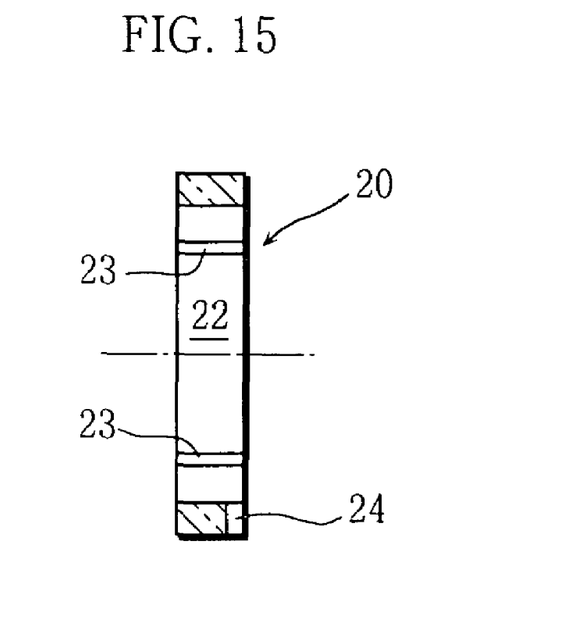
FIG. 15 is a cross-sectional view of T-T line in FIG. 12.

FIGS. 14 and 15 show a transparent rotation-stopping ring 20 of synthetic resin disposed inner to the clamp ring 5 in the axis direction within the restriction sleeve 10B (as shown in FIG. 10), and mounted to the peripheral face 1c of the forth end portion 1b of the inserted pipe 1 with predetermined resistance in rotation direction, in other words, as the predetermined resistance in rotation direction works when force in rotation direction is loaded on the pipe 1 to be connected. That is to say, the rotation-stopping ring 20 has plural protruding ridges 23 on the inner peripheral face 22 parallel to the axis direction. The cross-sectional configuration of the protruding ridge 23 is formed approximately triangular. The rotation-stopping ring 20 has a female fitting portion (hitched concave portion) 24 to which the male fitting portion (hitching convex portion) 19 of the clamp ring 5 (refer to FIGS. 12 and 13) hitches.

Figure 16:
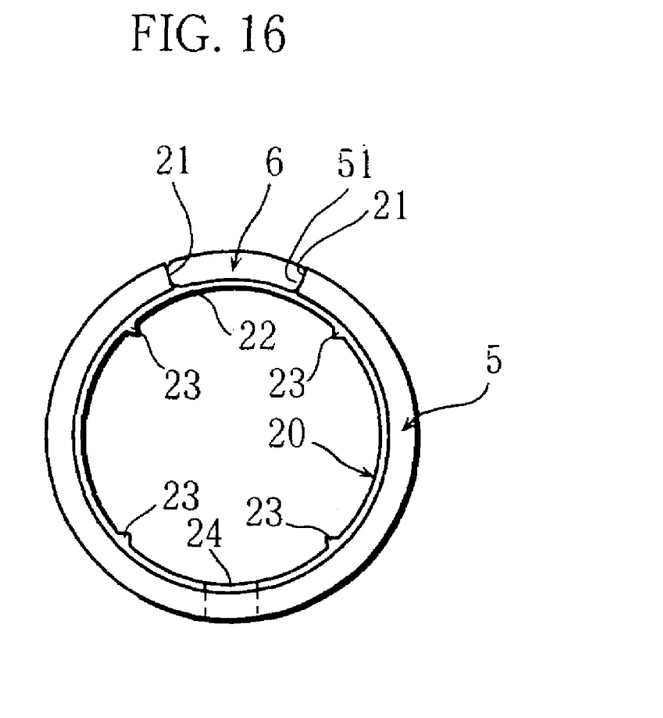
FIG. 16 is an explanatory view.
Figure 17:
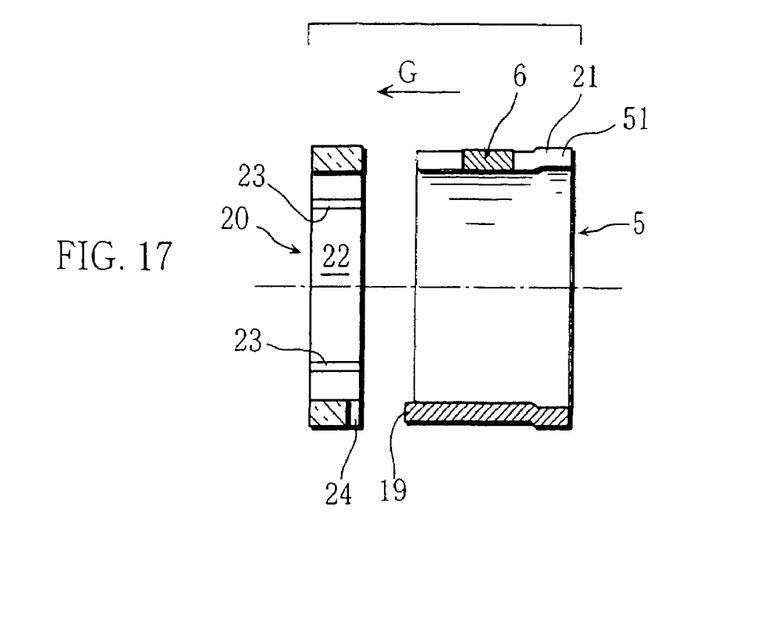
FIG. 17 is an explanatory view.

As shown in FIGS. 10 and 16, the clamp ring 5 and the rotation-stopping ring 20 are fit as not to relatively rotate. That is to say, as shown with an arrow G in FIG. 17, the male fitting portion 19 of the clamp ring 5 and the female fitting portion 24 of the rotation-stopping ring 20 are assembled to be mutually fit.

As described above, the pipe-insertion detector K, detecting the insertion of the pipe 1 to the predetermined depth and making the restriction releasable, is provided. Concretely, the pipe-insertion detector K allows the united rotation of the clamp ring 5 and the restriction sleeve 10B in uninserted state of the pipe (refer to FIGS. 10 and 11), namely, the clamp ring 5 and the restriction sleeve 10B rotate together, and stops the clamp ring 5 and allows only manual rotation of the restriction sleeve 10B, namely, slide in the rotation direction W (refer to FIG. 19), when the pipe 1 is inserted (refer to FIGS. 18 through 21). The pipe-insertion detector K is composed of the rotation-stopping ring 20 and the male and female fitting portions 19 and 24. In the present invention, "releasable" is defined as that the releasability is high as one movement (manual rotation of the restriction sleeve 10B in the third embodiment) can release the restriction.

Other parts of the third embodiment are composed similarly to that of the first embodiment.

Next, function of the pipe joint is described.

In the uninserted state of the pipe shown in FIGS. 10 and 11, the jumping movement of the diameter-expansion piece 6 is restricted because the clamp ring 5 and the restriction sleeve 10B rotate together.

Figure 18:
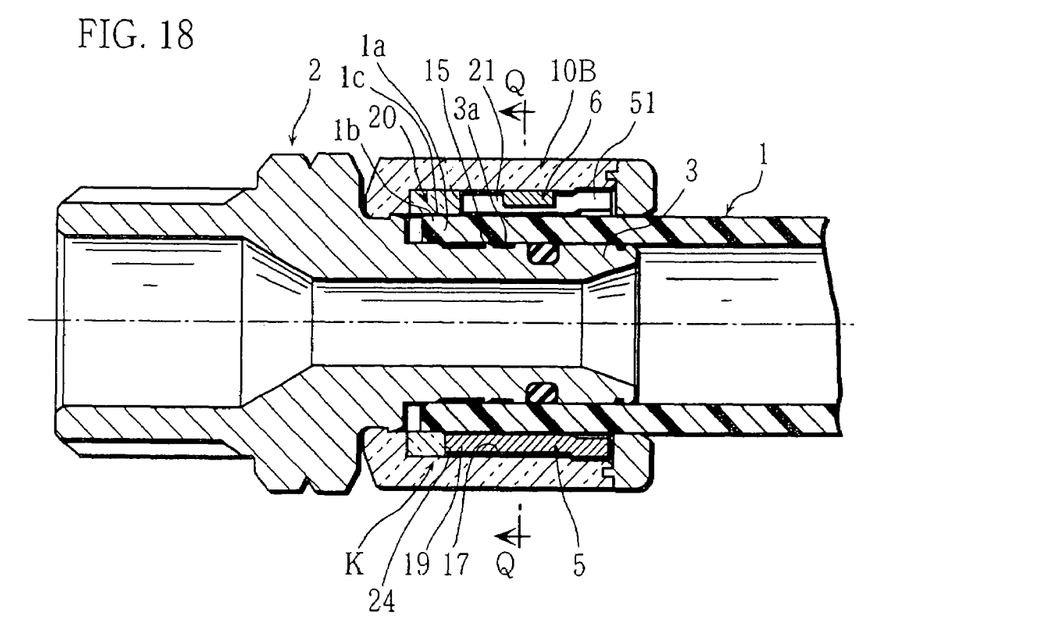
FIG. 18 is a functional explanatory view of the third embodiment.
Figure 19:
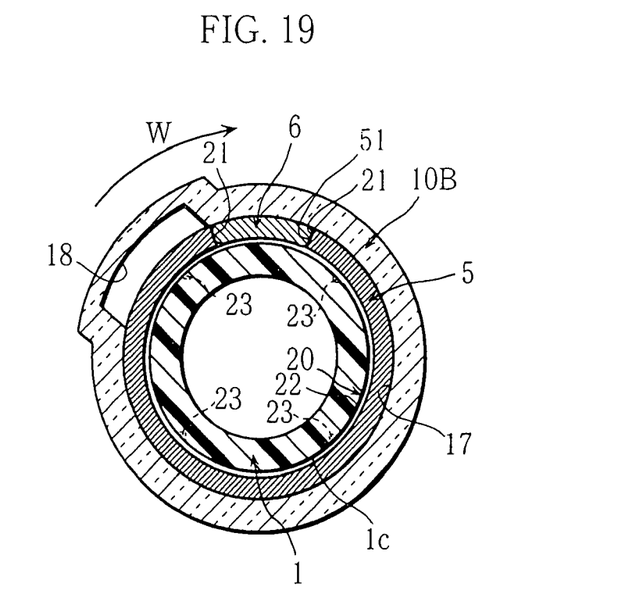
FIG. 19 is a cross-sectional view of Q-Q line in FIG. 18.
Figure 20:
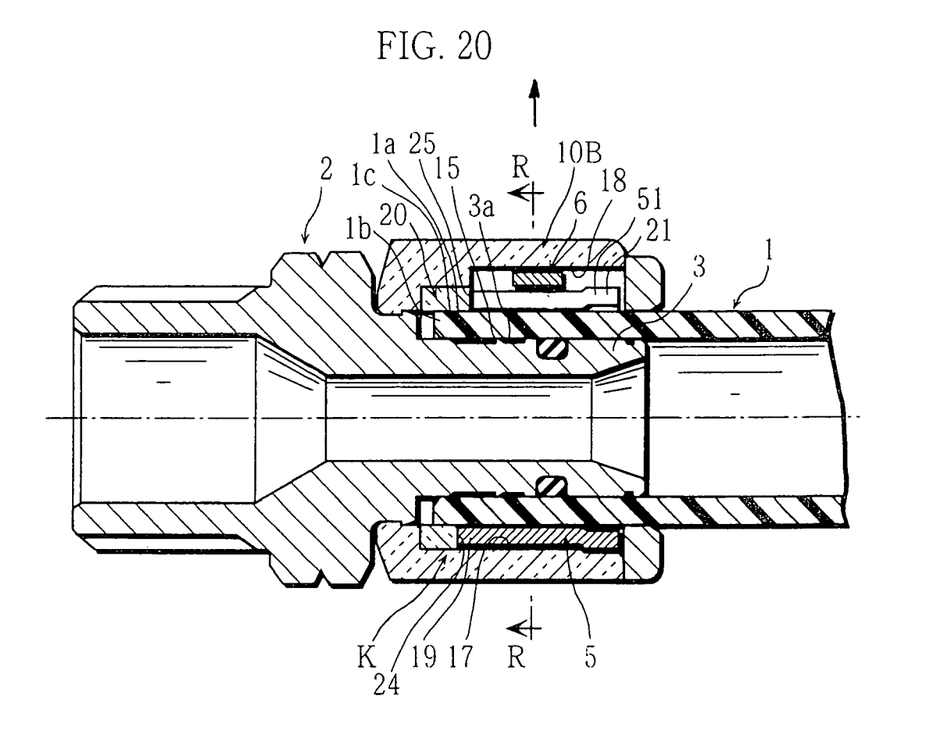
FIG. 20 is a functional explanatory view of the third embodiment.

When the pipe 1 to be connected is moved in an arrow C direction in FIG. 10, the protruding ridges 23 of the rotation-stopping ring 20 bite into the peripheral face 1c of the forth end portion 1b of the pipe 1 as shown in FIGS. 18 and 19. In this state (in which the pipe 1 is inserted into the rotation-stopping ring 20), rotation of the rotation-stopping ring 20 is restricted to the pipe 1 (by resistance in the rotation direction of the protruding ridges 23 biting into the peripheral face 1c of the pipe 1) even if a force in the rotation direction (from the restriction sleeve 10B) works on the rotation-stopping ring 20.

Then, only the restriction sleeve 10B is rotated (slid) in the rotation direction W in FIG. 19, the diameter-expansion piece 6, restricted as not to jump in outward direction, starts the jumping movement in the outward direction (in the direction of the arrow in FIGS. 20 and 21) because the diameter-expansion piece 6 receives the force F (in FIG. 11) from the end faces 21 as described above.

In the present invention, which can be modified in design, a concavo-convex (roulette-shaped, for example) or tapered hitching stop portion may be formed on the inner peripheral face of the clamp ring 5 to be hitched onto the peripheral face of the pipe 1. And, the configurations of the clamp ring 5, the diameter-expansion piece 6, the restriction sleeves 10A and 10B may be changed within the scope of the present invention.

And, in the third embodiment, the clamp ring 5 may have the female fitting portion (hitched concave portion) 24 and the rotation-stopping ring 20 may have the male fitting portion (hitching convex portion) 19 to hitch the clamp ring 5 to the rotation-stopping ring 20 as not to relatively rotate.

As described above, in the present invention, the pipe 1 can be easily connected because the pipe joint is provided with the joint main body 2 having the insertion cylinder portion 3 inserted to the end portion of the pipe 1 to be connected, the clamp ring 5 with the slit 51 to fasten the end portion of the pipe 1 mounted to the insertion cylinder portion 3 by elastic fastening force, the diameter-expansion piece 6, held within the slit 51 releasably when jumping outward, to expand the clamp ring 5 against elastic force of the clamp ring 5, the restriction sleeve 10A, or 10B covering the clamp ring 5 as to restrict outward jumping movement of the diameter-expansion piece 6, and the pipe-insertion detector K to detect the insertion of the pipe 1 to a predetermined depth and release or make releasable the restriction. And, a stop ring, having plural dent portions on the inner peripheral side, can be omitted because stopping is certainly made by the clamp ring 5 (and the hitching stop portion 15), and damage on the pipe 1 is prevented thereby.

The pipe 1 can be easily connected because the pipe joint is provided with the joint main body 2 having the insertion cylinder portion 3 inserted to the end portion of the pipe 1 to be connected, the clamp ring 5 with the slit 51 to fasten the end portion of the pipe 1 mounted to the insertion cylinder portion 3 by elastic fastening force, the diameter-expansion piece 6, held within the slit 51 releasably when jumping outward, to expand the clamp ring 5 against elastic force of the clamp ring 5, the restriction sleeve, and the restriction sleeve 10A, covering the clamp ring 5 as to restrict outward jumping movement of the diameter-expansion piece 6, contacts the forth end portion 10b of the inserted pipe 1 to slide in the axis inner direction to allow the outward jumping movement of the diameter-expansion piece 6. And, the insertion depth of the pipe 1 can be regulated by changing the length of the restriction sleeve 10A in the axis direction or choosing one restriction sleeve 10A among a series of restriction sleeves. And, the connection of the pipe 1 is certainly confirmed to check misworking in the insertion of the pipe 1 because the diameter-expansion piece 6 does not jump unless the pipe 1 is sufficiently inserted. Further, a stop ring, having plural dent portions on the inner peripheral side, can be omitted because stopping is certainly made by the clamp ring 5 (and the hitching stop portion 15), and damage on the pipe 1 is prevented thereby.

The diameter-expansion piece 6 can be held by (attached to) the clamp ring 5 as a wedge is inserted because the opening both end faces 21 forming the slit 51 of the clamp ring 5 are formed as to expand outward when observed in the axis direction, and the diameter-expansion piece 6 is made jump outward by the force F from the end faces 21. Especially, the attachment can be conducted with small force by setting of the angle α.

The clamp ring 5 can be uniformly expanded in the axis direction (as not to be tapered) to facilitate the insertion and stable fastening of the pipe 1 because the diameter-expansion piece 6 is held on an approximately central position of the slit 51 of the clamp ring 5 in the axis direction. Further, the length dimension of the clamp ring 5 in the axis direction can be set sufficiently large.

And, the pipe 1 can be easily connected because the pipe joint is provided with the joint main body 2 having the insertion cylinder portion 3 inserted to the end portion of the pipe 1 to be connected, the clamp ring 5 with the slit 51 to fasten the end portion of the pipe 1 mounted to the insertion cylinder portion 3 by elastic fastening force, the diameter-expansion piece 6, held within the slit 51 releasably when jumping outward, to expand the clamp ring 5 against elastic force of the clamp ring 5, and the manually-rotatable restriction sleeve 10B covering the clamp ring 5 as to restrict outward jumping movement of the diameter-expansion piece 6 and having the escape concave portion 18 on a part of the inner peripheral face 17 to allow the jumping movement. And, a stop ring, having plural dent portions on the inner peripheral side, can be omitted because stopping is certainly made by the clamp ring 5 (and the hitching stop portion 15), and damage on the pipe 1 is prevented thereby. Further, length dimension of the whole pipe joint can be set small.

The pipe 1 can be easily connected because the pipe joint is provided with the joint main body 2 having the insertion cylinder portion 3 inserted to the end portion of the pipe 1 to be connected, the clamp ring 5 with the slit 51 to fasten the end portion of the pipe 1 mounted to the insertion cylinder portion 3 by elastic fastening force, the diameter-expansion piece 6, held within the slit 51 releasably when jumping outward, to expand the clamp ring 5 against elastic force of the clamp ring 5, and the manually-rotatable restriction sleeve 10B covering the clamp ring 5 as to restrict outward jumping movement of the diameter-expansion piece 6 and having the escape concave portion 18 on a part of the inner peripheral face 17 to allow the jumping movement, and the pipe-insertion detector K to allow united rotation of the clamp ring 5 and the restriction sleeve 10B in uninserted state of the pipe, and stop the rotation of the clamp ring 5 and allow only manual rotation of the restriction sleeve 10B when the pipe 1 is inserted. And, the connection of the pipe 1 is certainly confirmed to check misworking in the insertion of the pipe 1 because the restriction sleeve 10B can not be manually rotated (the diameter-expansion piece 6 does not jump) unless the pipe 1 is sufficiently inserted. And, a stop ring, having plural dent portions on the inner peripheral side, can be omitted because stopping is certainly made by the clamp ring 5 (and the hitching stop portion 15), and damage on the pipe 1 is prevented thereby. Further, length dimension of the whole pipe joint can be set small.

The whole pipe joint is made simple because the pipe-insertion detector K is composed of the rotation-stopping ring 20, disposed inner to the clamp ring 5 in the axis direction within the restriction sleeve 10B and mounted on the peripheral face 1c of the forth end portion 1b of the inserted pipe 1 with predetermined resistance in the rotation direction, and the male and female fitting portions 19 and 24 to fit the clamp ring 5 to the rotation-stopping ring 20 as not to relatively rotate. And, when the restriction sleeve 10B and the rotation-stopping ring 20 are made of transparent synthetic resin, the insertion position of the pipe 1 can be seen from outside to easily confirm the insertion position.

The diameter-expansion piece 6 can be held by (attached to) the clamp ring 5 as a wedge is inserted because the opening both end faces 21 forming the slit 51 of the clamp ring 5 are formed as to expand outward when observed in the axis direction, and the diameter-expansion piece 6 is made jump outward by the force F from the end faces 21. Especially, the attachment can be conducted with small force by setting of the angle α.

And, the clamp ring 5 can be uniformly expanded in the axis direction (as not to be tapered) to facilitate the insertion and stable fastening of the pipe 1 because the diameter-expansion piece 6 is held on an approximately central position of the slit 51 of the clamp ring 5 in the axis direction.

While preferred embodiments of the present invention have been described in this specification, it is to be understood that the invention is illustrative and not restrictive, because various changes are possible within the spirit and indispensable features.

What is claimed is:

1. A pipe joint comprising a joint main body having an insertion cylinder portion inserted into an end portion of a pipe to be connected, a clamp ring with a slit to fasten the end portion of the pipe mounted to the insertion cylinder portion by elastic fastening force, a diameter-expansion piece releasably held within the slit to expand the clamp ring against elastic force of the clamp ring, and a restriction sleeve covering the clamp ring as to restrict radial outward jumping movement of the diameter-expansion piece, contacts a forth end portion of the inserted pipe to slide in an axis inner direction to allow the radial outward jumping movement of the diameter-expansion piece, wherein opening both end faces of the clamping ring forming the slit of the clamp ring expanded outward by the diameter-expansion piece, and, upon sliding of the restriction sleeve in the axis inner direction, the diameter-expansion piece is made to jump radially outward by force generated by the expanded clamp ring and transferred to the diameter-expansion piece from the end faces, thereby clamping the end portion of the pipe to the joint main body.

2. The pipe joint as set forth in claim 1, wherein the diameter-expansion piece is held on an approximately central position of the slit of the clamp ring in the axis direction.

* * * * *